United States Patent
Batinic et al.

(12)

(10) Patent No.: US 6,351,814 B1
(45) Date of Patent: Feb. 26, 2002

(54) FIELD PROGRAMMABLE GATE ARRAY WITH PROGRAM ENCRYPTION

(75) Inventors: Ivan-Pierre Batinic, San Martin; Lawrence Kraus, San Jose; Marc P. Loranger, Livermore, all of CA (US)

(73) Assignee: Credence Systems Corporation, Fremont, CA (US)

( * ) Notice: Subject to any disclaimer, the term of this patent is extended or adjusted under 35 U.S.C. 154(b) by 0 days.

(21) Appl. No.: 09/358,687

(22) Filed: Jul. 21, 1999

(51) Int. Cl.[7] .............................................. G06K 19/06
(52) U.S. Cl. ........................ 713/194; 713/190; 380/283; 380/264
(58) Field of Search ................................ 713/194, 190, 713/189; 380/264, 283

(56) References Cited

U.S. PATENT DOCUMENTS

| 4,823,308 A | * | 4/1989 | Knight ........................ 364/900 |
| 5,671,281 A | * | 9/1997 | Campbell et al. ............. 380/25 |
| 6,044,157 A | * | 3/2000 | Uesaka et al. .............. 380/201 |
| 6,058,476 A | * | 5/2000 | Matsuzaki et al. .......... 713/169 |
| 6,089,460 A | * | 7/2000 | Hazama ...................... 235/492 |
| 6,212,639 B1 | * | 4/2001 | Erickson ..................... 713/200 |

* cited by examiner

*Primary Examiner*—Albert Decady
*Assistant Examiner*—Todd Jack
(74) *Attorney, Agent, or Firm*—Daniel J. Bedell; Smith-Hill and Bedell

(57) ABSTRACT

A field programmable gate array (FPGA) and a decryption circuit are implemented within a common integrated circuit (IC) or within separate ICs enclosed within a common IC package. The decryption circuit decrypts an input FPGA program encrypted in accordance with a particular encryption key and then writes the decrypted FPGA program into the FPGA. Thus an FPGA program encrypted in accordance with a particular encryption key can be used to program only those FPGAs coupled with a decryption circuit capable of decoding the encrypted FPGA program in accordance with that particular encryption key. Since the decryption circuit and the FPGA are implemented in the same IC, or within the same IC package, the decrypted FPGA program the decryption circuit produces cannot be readily intercepted and copied.

18 Claims, 3 Drawing Sheets

FIELD PROGRAMMABLE GATE ARRAY WITH PROGRAM ENCRYPTION

BACKGROUND OF THE INVENTION

1. Field of the Invention

Figure 1:
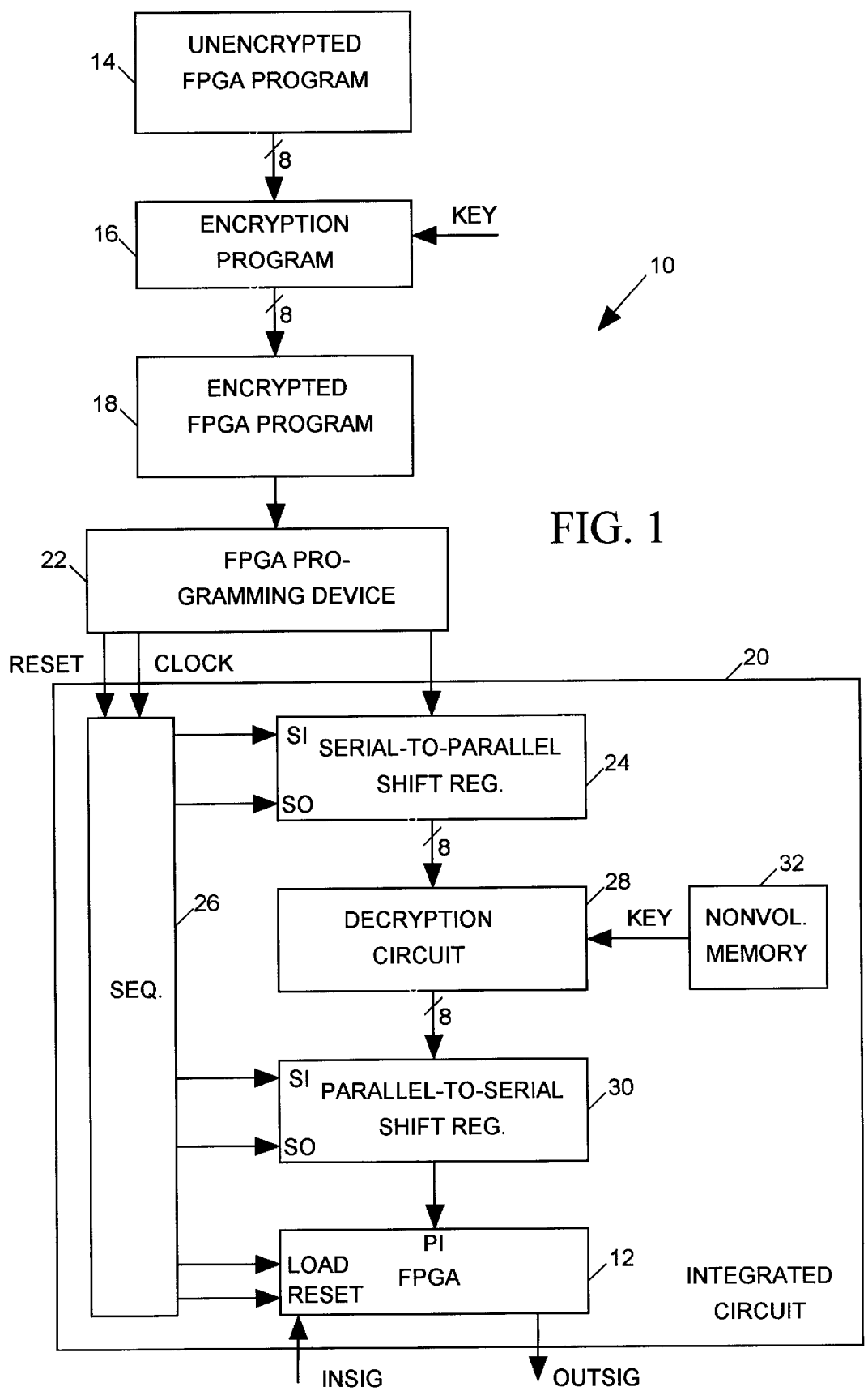

The present invention relates in general to a system for encoding a field programmable gate array (FPGA) program so that it can be used to program only a particular set of FPGAs capable of decoding the program.

2. Description of Related Art

A field programmable gate array (FPGA) includes a large number of logic blocks linked to one another and to FPGA input and output (I/O) terminals through signal routing devices. Routing data stored in the FPGA controls the logic the FPGA carries out on its input signals to produce its output signals by telling the routing devices how to route data between the logic blocks and the FPGA's I/O terminals. An FPGA program is therefore simply a sequence of routing data supplied as input to the FPGA's programming terminals. We typically program (or reprogram) an FPGA by supplying a data file containing the routing data to an FPGA programming device which then writes that routing data into the FPGA.

FPGA program developers or distributors have in interest in preventing unlicensed use of their FPGA programs. For example an FPGA program developer or distributor may find it convenient to allow customers to download FPGA programs from a public internet site, but may want to prevent others from using those programs without first obtaining a license. Or when an FPGA program developer licenses a customer to program only a particular set of FPGAs, the program developer would like to prevent that customer, or anyone else, from using that FPGA program to program other FPGAs.

Some computer programs are encrypted so that they cannot be used to program a computer unless first decrypted in a manner determined by a special code (an "encryption key"). When a customer purchases a license to use the software, the licensor provides the customer with the correct encryption key. When the customer thereafter obtains the software and invokes its installation program, the installation program queries the customer for the encryption key. The installation program then decrypts the program in accordance with the key and installs the decrypted version of the program on the customer's computer. Thus even though someone other than the customer may download the encrypted program, that person will not be able to install that program on a computer unless he is able to provide the installation program with the correct encryption key.

A similar encryption system could be used to encrypt FPGA programs by equipping the FPGA programming device with an decryption circuit or program requiring the user to provide the appropriate encryption key. However while such an encryption system would reduce the chance that an FPGA program will be used by someone other than the customer, the customer or anyone else having access to the encryption key could use the FPGA program to program any number of FPGAs. Also the decrypted version of the FPGA program could be intercepted at the output of the FPGA programming device and thereafter used to program FPGAs without need for decryption.

What is needed is a system for preventing anyone from using an FPGA program to program other than a particular set of FPGAs.

SUMMARY OF THE INVENTION

A field programmable gate array (FPGA) implements logic controlled by an FPGA program (a data sequence) written into the FPGA. In accordance with one aspect the invention, the FPGA program to be written into that memory array is first encrypted so that it must be decrypted in accordance with a predetermined encryption key before being written into the FPGA.

In accordance with another aspect of the invention, an integrated circuit (IC) implementing the FPGA to be programmed by an encrypted FPGA program includes an internal decryption circuit for receiving and decrypting the encrypted FPGA program in accordance with the appropriate encryption key to produce a decrypted FPGA program. The decryption circuit then writes the decrypted FPGA program into the FPGA's internal memory array. Thus the encrypted FPGA program can't be used to program FPGAs not equipped with a decryption circuit capable of decrypting the FPGA program in accordance with the appropriate encryption key. Also since the decryption circuit and FPGA are implemented within the same IC, the output terminals of the decryption circuit are not readily accessible. The decrypted FPGA program output of the decryption circuit therefore cannot be not readily intercepted and copied.

In an alternative embodiment of the invention, the decryption circuit and the FPGA are implemented on separate IC chips, but the chips are interconnected and enclosed within the same IC package so that the decrypted FPGA program output of the decryption circuit is not readily accessible.

It is accordingly an object of the invention to provide a system for preventing use of an FPGA program for programming FPGAs other than a particular set of FPGAs for which the FPGA program is intended.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWING(s)

Figure 2:
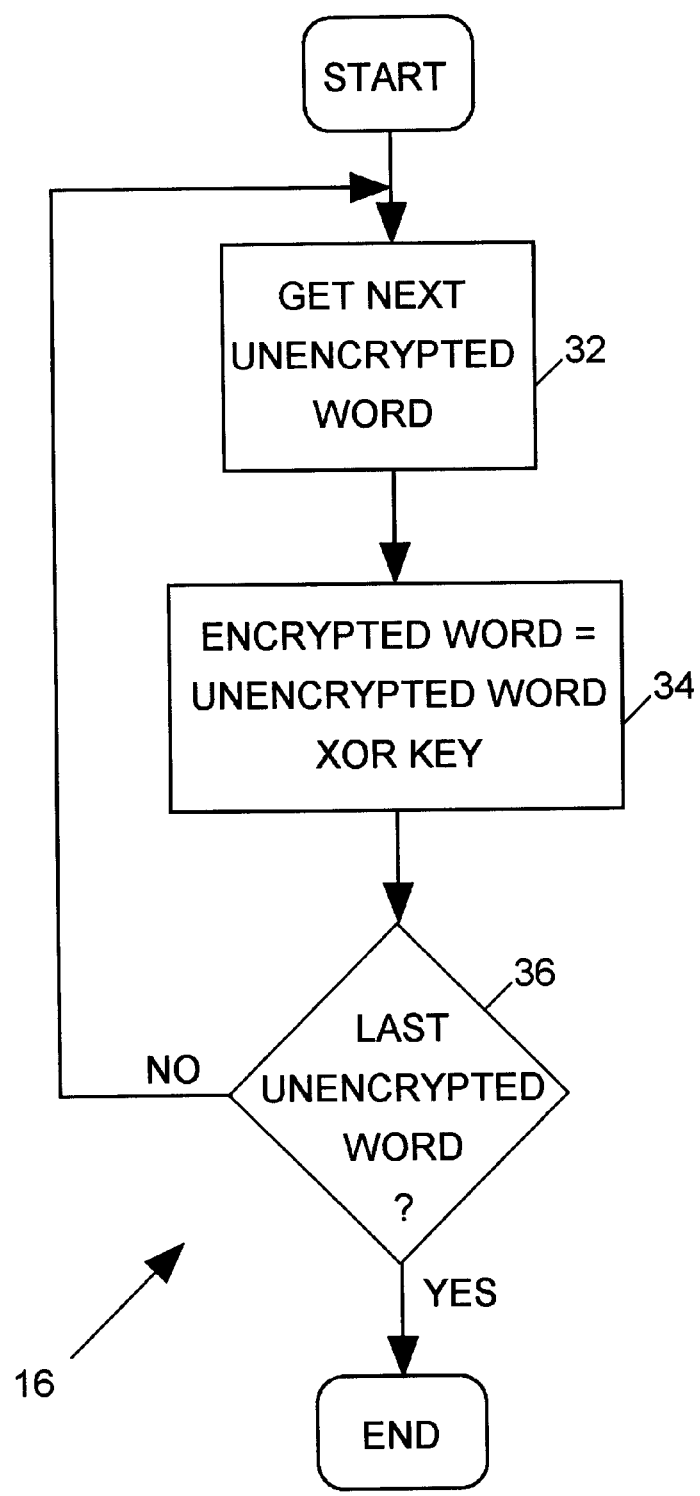
Figure 3:
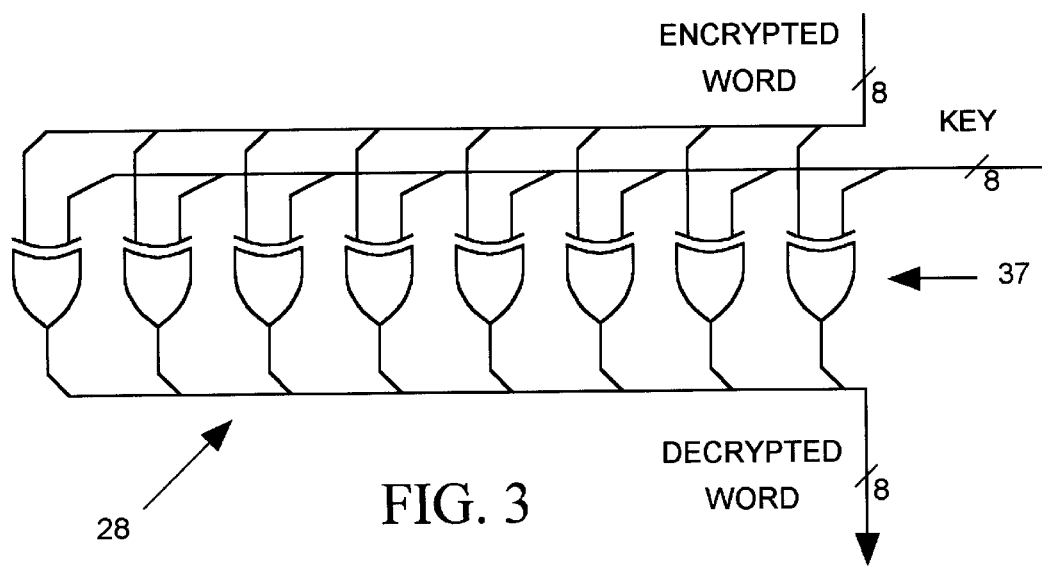
Figure 4:
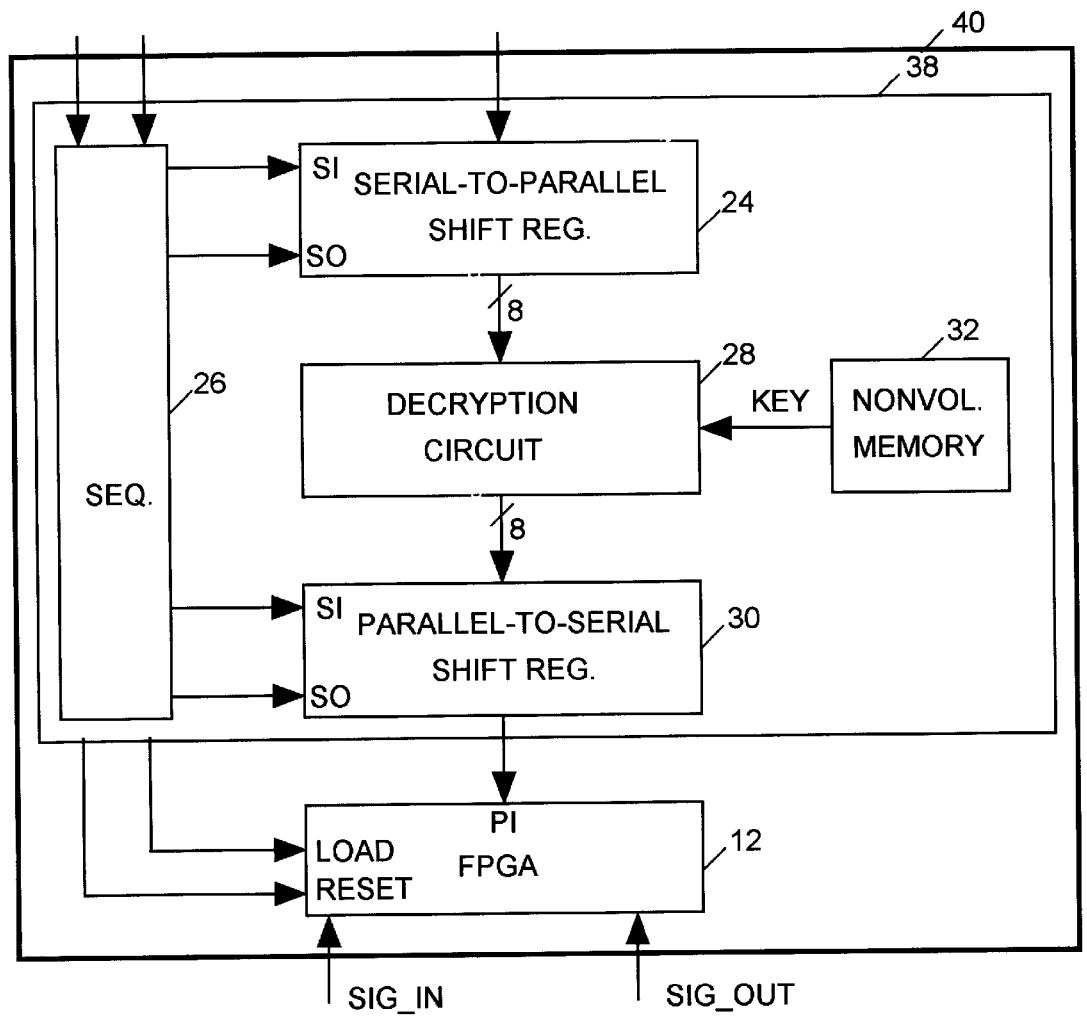

FIG. 1 illustrates in block diagram form an FPGA program encryption system in accordance with the invention, FIG. 2 illustrate the encryption program of FIG. 1 in flow chart form, FIG. 3 illustrates a suitable implementation of the decryption circuit of FIG. 1 in schematic diagram form, and FIG. 4 illustrates an alternative embodiment of the FPGA program encryption system in accordance with the invention.

DESCRIPTION OF THE PREFERRED EMBODIMENT(s)

A field programmable gate array (FPGA) includes a large number of logic blocks linked to one another and to FPGA input and output (I/O) terminals through signal routing devices. Routing data stored in the FPGA controls the logic the FPGA carries out on its input signals to produce its output signals by telling the routing devices how to route data between the logic blocks and the FPGA's I/O terminals. An FPGA "program" is simply a sequence of routing data supplied as input to the FPGA's programming terminals. We typically program (or reprogram) an FPGA by generating a data file containing the routing data and supplying it to a conventional FPGA programming device which then writes that routing data into the FPGA. The present invention relates to an FPGA program encryption system for encrypting an FPGA program so that it can be used to program only a particular set of FPGAs that are adapted to decrypt the program.

FIG. 1 illustrates in block diagram form an FPGA program encryption system 10 in accordance with the invention. System 10 includes a conventional FPGA 12 capable of receiving and storing an FPGA program 14 for controlling logical relationships between the FPGA's input signals (INSIG) and its output signals (OUTSIG). In accordance with the invention, a conventional encryption program 16 encrypts each successive word of FPGA program 14 to produce a corresponding word of an encrypted version 18 of FPGA program 14. Encryption program 16 bases its encryption on an input encryption key (KEY). As illustrated herein, encryption program 16 receives 8-bit FPGA program words, produces 8-bit output encrypted FPGA program words, and employs an 8-bit encryption key. However the key and word size may be larger or smaller in alternative implementations of the system.

FPGA 12 is incorporated into an integrated circuit (IC) 20 along with other circuits (24–32) capable of decrypting encrypted FPGA program 18 and loading the resulting decrypted FPGA program into FPGA 12 via its programming input (PI). A conventional FPGA programming device 22 external to (IC) 20 transmits a RESET signal to a sequencer 26 and then serially shifts each bit of the encrypted FPGA program into a serial-to-parallel shift register 24, pulsing a CLOCK signal output when each bit is available at the shift register input. Sequencer 26 responds to the RESET signal by pulsing a reset input of FPGA 12 telling it to prepare to receive an input FPGA program. Sequencer 26 thereafter pulses a shift in (SI) input of shift register 24 in response to each pulse of its input CLOCK signal so as to shift each incoming bit of the encoded FPGA program 18 into shift register 24. Shift register 24 assembles its serial input FPGA program into a sequence of 8-bit words and supplies them to a decryption circuit 28. Using the same encryption key (KEY) encryption program 16 used when creating encrypted FPGA program 18, decryption circuit 28 decrypts each of the encrypted program's 8-bit words to reproduce a corresponding 8-bit word of the original unencrypted FPGA program 14. A conventional nonvolatile memory 32 also included in IC 20 stores the encryption KEY and provides it to decryption circuit 28.

Decryption circuit 28 provides each decrypted FPGA program word output as input to a parallel-to-serial shift register 30. Sequencer 26 pulses a shift in (SI) input of shift register 30 to load each successive decrypted FPGA program word into shift register 30 and sequentially pulses its shift out (SO) input causing shift register 30 to serially shift each bit of the word to a programming input (PI) of FPGA 12. Sequencer 26 also sequentially pulses a LOAD input of FPGA 12 telling it to store each bit of the decrypted FPGA program word. Thus devices 24–32 decrypt each word of encrypted FPGA program 18 and write the result into FPGA 12 thereby programming it in accordance with unencrypted FPGA program 14.

Encryption system 10 allows an FPGA program developer or distributor to prevent unlicensed use of FPGA program 14. For example, an FPGA program developer may provide a customer not only the encrypted FPGA program 18, but also an IC 20 including the FPGA 12 to be programmed. Before delivering the IC to the customer, the developer writes the appropriate decryption key into its nonvolatile memory 32. Thus the customer, or anyone else obtaining a copy of the encrypted FPGA program 18, can use the FPGA program to program only the FPGA 12 included within the particular IC 20 having a decryption circuit 28 capable of appropriately decrypting the FPGA program. Note that since decryption circuit 28 is embedded within IC 20, its output terminals are not readily assessable. Thus a customer cannot readily intercept the decrypted FPGA program it supplies to FPGA 12 and use it to program conventional FPGAs not equipped with the appropriate decryption system. Note also that since the encryption key is also embedded in IC 20, it is not readily available to the customer or anyone else. Thus only the developer will know the key and only the developer will be able to appropriately encrypt programs for IC 20. Therefore when a customer wishes to reprogram FPGA 12 so that it carries out different logic, the customer will have to obtain an appropriately encrypted program from the developer rather than from other sources.

Encryption Program and Decryption Circuit

FIG. 2 illustrates a simple encryption program suitable for use as encryption program 16. Beginning at step 32 encryption program 16 reads a next (first) word of unencrypted program 14 and then exclusive ORs (XORs) each bit of the unencrypted word with a corresponding bit of the encryption key to produce a word of encrypted program 18 output (step 34). When the last processed unencrypted word is not the last word of unencrypted FPGA program 14 (step 36), encryption program 16 repeats steps 32 and 34 to obtain and XOR a next unencrypted word of FPGA program 14 to produce a corresponding word of encrypted program 18. Encryption program 16 ends following step 36 when the last word of unencrypted FPGA program 14 has been encrypted.

FIG. 3 illustrates a simple implementation of decryption circuit 28 of FIG. 1 suitable for decrypting the output of program 16 of FIG. 2. Decryption circuit 28 includes a set of eight exclusive OR (XOR) gates 37. Each XOR gate 37 XORs a bit of an 8-bit encrypted word with a corresponding word of the 8-bit encryption key (KEY) to produce a corresponding word of decrypted data. Let us assume, for example that an 8-bit word of unencrypted FPGA program 14 has the binary value (10011011) and that the 8-bit encryption key has value (11010010). Encryption program 16 XORs the two 8-bit values to produce a word of encrypted FPGA program 18 having value as follows:

Encrypted=Unencrypted XOR KEY (01000001)=(10011011)XOR(11010010)

When decryption circuit 28 receives the encrypted word (01000001) and XORs it with the original encryption key value (11010010) it reproduces the original unencrypted word as follows:

Unencrypted=Encrypted XOR KEY (10011011)=(01000001)XOR(11010010)

An 8-bit encryption key allows for $2^8$ different encryption key values. We can increase the size of the encryption key, for example, to 16-bit to allow for $2^{16}$ possible values. To do so we simply increase to 16 the width of the data word input and output of encryption program 16, the width of the data path between shift register 24 and shift register 30 and the number of gates 37 of decryption circuit 28 of FIG. 3.

Multiple-chip Module Version

FIG. 4 illustrates an alternative embodiment of the invention in which devices 24–32 of FIG. 1 for decrypting the encrypted FPGA program are implemented in an IC chip 38 that does not include FPGA 12. However FPGA 12 and IC chip 38 are mounted within a common IC package 40 using conventional multiple-chip module technology. Since the connection between FPGA 12 and IC chip 38 is within package 40, it is not readily accessible to one wishing to copy the decrypted output sequence produced by IC chip 38.

Design Alternatives

While the forgoing specification has described preferred embodiments of the present invention, one skilled in the art may make many modifications to the preferred embodiment without departing from the invention in its broader aspects. For example, for FPGAs having a programming input (PI) wider than one bit, shift register 30 may be modified to provide a sufficiently wide output. Many well-known systems for encrypting and decrypting data could be used to implement the functions of encryption program 16 and decryption circuit 28 of FIG. 1. Any of several well-known technologies including flash memory cells and fuse technologies could be used to implement nonvolatile memory 32. The encryption key value input to decryption circuit 28 could alternatively be provided as a "hard wired" input to decryption circuit 28 by appropriately programming IC 20 at the mask level during IC fabrication, stored in volatile memory (registers, flip-flops, SRAM etc.) within IC 20. The encryption key may also be provided to decryption circuit 28 from a source external to IC 20. Also while the preferred embodiment of the encryption system is illustrated herein as being used in connection with an FPGA, it should be understood that a similar encryption system could be used in connection with other kinds of logic devices that are programmed by input data sequences. The appended claims are therefore intended to cover all such modifications as fall within the true scope and spirit of the invention.

What is claimed is:

1. An apparatus for carrying out digital logic operations on digital input signals to produce digital output signals, said apparatus comprising:
    a digital logic circuit for receiving and decrypting a first program to produce a second program, and
    a programmable logic circuit for receiving said second program, said programmable logic circuit being programmed by said second program for carrying out said digital logic operations on said digital input signals to produce said digital output signals.

2. The apparatus in accordance with claim 1 wherein said programmable logic circuit comprises a field programmable gate array.

3. The apparatus in accordance with claim 1 wherein said digital logic circuit and said programmable logic circuit are implemented within in a common integrated circuit.

4. The apparatus in accordance with claim 1 further comprising an integrated circuit package, said digital logic circuit and said programmable logic circuit being enclosed within said integrated circuit package.

5. The apparatus in accordance with claim 1 further comprising a means for providing said digital logic circuit with an encryption key, wherein said digital logic circuit decrypts said first program in a manner determined by said encryption key.

6. The apparatus in accordance with claim 5 wherein said means for providing said encryption key comprises a nonvolatile memory.

7. The apparatus in accordance with claim 1 further comprising:
    a means for providing said digital logic circuit with an encryption key, wherein said digital logic circuit decrypts said first program in a manner determined by said encryption key; and
    an integrated circuit package, said digital logic circuit, said programmable logic circuit and said means for providing said encryption key being contained within said integrated circuit package.

8. The apparatus in accordance with claim 7 wherein said programmable logic circuit comprises a field programmable gate array.

9. The apparatus in accordance with claim 8 wherein said means for providing said encryption key comprises a nonvolatile memory.

10. An apparatus for carrying out digital logic operations on digital input signals to produce digital output signals, said apparatus comprising:
    means for encrypting a first program to produce a second program,
    a digital logic circuit for receiving and decrypting said second program to produce a copy of said first program, and
    a programmable logic circuit for receiving said first program, said programmable logic circuit being programmed by said copy of said first program for carrying out said digital logic operations on said digital input signals to produce said digital output signals.

11. The apparatus in accordance with claim 10 wherein said programmable logic circuit comprises a field programmable gate array.

12. The apparatus in accordance with claim 10 wherein said digital logic circuit and said programmable logic circuit are implemented within in a common integrated circuit.

13. The apparatus in accordance with claim 10 further comprising an integrated circuit package, said digital logic circuit and said programmable logic circuit being contained within said integrated circuit package.

14. The apparatus in accordance with claim 10 further comprising a means for providing said digital logic circuit with an encryption key, wherein said means for encrypting encrypts said first program in a manner determined by said encryption key and wherein said digital logic circuit decrypts said second program in a manner determined by said encryption key.

15. The apparatus in accordance with claim 14 wherein said means for providing said encryption key comprises a nonvolatile memory.

16. The apparatus in accordance with claim 14 further comprising an integrated circuit package, said digital logic circuit and said programmable logic circuit being contained within said integrated circuit package.

17. The apparatus in accordance with claim 14 wherein said digital logic circuit and said programmable logic circuit are implemented within in a common integrated circuit.

18. A method for programming a programmable logic circuit for carrying out digital logic operations on digital input signals to produce digital output signals, said method comprising the steps of:
    encrypting a first program in a manner determined by an encryption key to produce an encrypted second program;
    decrypting said encrypted second program in a manner determined by said encryption key to produce a copy of said first program, and
    supplying said copy of said first program as an input program to said programmable logic circuit.

* * * * *